US011262522B2

(12) United States Patent
Kumar et al.

(10) Patent No.: US 11,262,522 B2
(45) Date of Patent: Mar. 1, 2022

(54) MULTI LOOSE TUBE RIBBON CABLE

(71) Applicant: Sterlite Technologies Limited, Maharashtra (IN)

(72) Inventors: Sravan Kumar, Maharashtra (IN); Kishore Sahoo, Maharashtra (IN); Kavya Chintada, Maharashtra (IN); Venkatesh Murthy, Maharashtra (IN); Atul Mishra, Maharashtra (IN); Pavan Moturu, Maharashtra (IN); kangabam tenzing, Maharashtra (IN)

(73) Assignee: STERLITE TECHNOLOGIES LIMITED, Aurangabad (IN), PART INTEREST ( * ) Notice: Subject to any disclaimer, the term of this patent is extended or adjusted under 35 U.S.C. 154(b) by 0 days.

(21) Appl. No.: 16/224,759

(22) Filed: Dec. 18, 2018

(65) Prior Publication Data
US 2020/0192049 A1 Jun. 18, 2020

(51) Int. Cl.
*G02B 6/44* (2006.01)
(52) U.S. Cl.
CPC .................. *G02B 6/4494* (2013.01)
(58) Field of Classification Search
CPC .. G02B 6/4403; G02B 6/4404; G02B 6/4494; G02B 6/44; G02B 6/4429; G02B 6/4401
See application file for complete search history.

(56) References Cited

U.S. PATENT DOCUMENTS

| | | | | |
|---|---|---|---|---|
| 5,608,832 A * | 3/1997 | Pfandl | .................. | G02B 6/4403 385/105 |
| 7,936,957 B1* | 5/2011 | Puzan | .................. | G02B 6/4433 385/105 |
| 2007/0047885 A1* | 3/2007 | Mayer | .................. | G02B 6/4403 385/114 |
| 2009/0074363 A1* | 3/2009 | Parsons | ................ | G02B 6/4429 385/103 |
| 2009/0175583 A1* | 7/2009 | Overton | ................ | C03C 13/046 385/100 |
| 2009/0190890 A1* | 7/2009 | Freeland | ............... | G02B 6/4433 385/111 |
| 2009/0232453 A1* | 9/2009 | Muendel | ................ | G02B 6/262 385/43 |
| 2009/0279835 A1* | 11/2009 | de Montmorillon | ........ | G02B 6/0365 385/127 |
| 2010/0135625 A1* | 6/2010 | Overton | ................ | C03C 25/106 385/114 |
| 2010/0189397 A1* | 7/2010 | Richard | ............. | G02B 6/02019 385/123 |
| 2010/0290781 A1* | 11/2010 | Overton | ................ | C03C 13/046 398/43 |
| 2012/0120389 A1* | 5/2012 | Logan | ................ | G01D 5/35345 356/73.1 |

(Continued)

*Primary Examiner* — Thomas A Hollweg
*Assistant Examiner* — Mary A El-Shammaa (57) ABSTRACT

The present disclosure provides an optical fiber cable. The optical fiber cable includes at least one optical fiber ribbon stack. In addition, the at least one optical fiber ribbon stack includes a plurality of stacked ribbons. Further, each ribbon of the plurality of stacked ribbons includes a plurality of optical fibers. The plurality of optical fibers includes edge fibers. The edge fibers are defined as the at least one optical fiber having a mach number of at most 7.2 disposed at a first end and a second end of a first ribbon and a last ribbon of the plurality of stacked ribbons.

12 Claims, 2 Drawing Sheets

(56) References Cited

U.S. PATENT DOCUMENTS

2013/0084047 A1\* 4/2013 Baucom ................ G02B 6/44
385/114

\* cited by examiner

FIG. 1

FIG. 2

MULTI LOOSE TUBE RIBBON CABLE

FIELD OF THE INVENTION

The present disclosure relates to the field of optical fiber cable and, in particular, relates to a multi loose tube ribbon cable.

DESCRIPTION OF THE RELATED ART

Over the last few years, optical fiber cables have been increasingly employed for various industrial applications. One such type of optical fiber cable is optical fiber ribbon cables which are used for telecommunication purpose. These optical fiber ribbon cables include a plurality of optical fibers ribbons. Each optical fiber ribbon includes a number of optical fibers placed adjacent and bonded together with a matrix material. Some optical fiber ribbon cables are designed for large data transmission which requires large number of optical fibers inside the optical fiber ribbon cable. These optical fiber ribbons may be held inside a buffer tube which may be covered by additional layers such as water blocking layers, armoring layer, sheathing layer and the like. Further, these optical fiber ribbon cables have various characteristics towards temperature, pressure, stress, strain and the like.

The currently available optical fiber cables have certain drawbacks. The existing optical fiber cables show high optical losses when the cable undergoes to a temperature cycling test. In addition, the existing optical fiber cables show high micro bending loss at negative temperature. Further, the existing optical fiber cable faces an issue of edge fiber failures in negative temperature. In light of the foregoing discussion, there exists a need for an optical fiber cable which overcomes the above cited drawbacks of conventionally known optical fiber cables.

BRIEF SUMMARY OF THE INVENTION

In an aspect, the present disclosure provides an optical fiber cable. The optical fiber cable includes atleast one optical fiber ribbon stack. In addition, the atleast one optical fiber ribbon stack includes a plurality of stacked ribbons. Further, each ribbon of the plurality of stacked ribbons includes a plurality of optical fibers. The plurality of optical fibers includes edge fibers. The edge fibers are defined as the optical fibers having a MAC number of at most 7.2 disposed at a first end and a second end of a first ribbon and a last ribbon of the plurality of stacked ribbons.

A primary object of the present disclosure is to provide an optical fiber cable with reduced micro bending losses.

Another object of the present disclosure is to provide the optical fiber cable having edge fibers with MAC number less than 7.2.

Yet another object of the present disclosure is to provide the optical fiber cable having optimized overlap of water blocking tape with the buffer tube.

In an aspect, the present disclosure provides an optical fiber cable. The optical fiber cable includes atleast one optical fiber ribbon stack. In addition, the atleast one optical fiber ribbon stack includes a plurality of stacked ribbons. Further, each ribbon of the plurality of stacked ribbons includes a plurality of optical fibers. The plurality of optical fibers includes edge fibers. The edge fibers are defined as the optical fibers having a MAC number of at most 7.2 disposed at a first end and a second end of a first ribbon and a last ribbon of the plurality of stacked ribbons.

In an embodiment of the present disclosure, the optical fiber cable includes a plurality of buffer tubes. Each of the plurality of buffer tubes includes an optical fiber ribbon stack. In addition, a difference between a first diameter of each of the plurality of buffer tubes and the diagonal distance of the corresponding optical fiber ribbon stack constitutes a gap of about 0.35 millimeter.

In an embodiment of the present disclosure, the optical fiber cable includes a plurality of fillers. In addition, each of the plurality of fillers is made of a fiber reinforced plastic up coated with a polyethylene material.

In an embodiment of the present disclosure, the optical fiber cable includes a plurality of buffer tubes. In addition, each of the plurality of buffer tubes is made of a thermoplastic material and has a thickness of about 30 millimetres. Further, each of the plurality of buffer tubes has a maximum shrinkage of about 11.29%. Furthermore, each of the plurality of buffer tubes has a first diameter in a range of about 6.8±0.2 millimetres.

In an embodiment of the present disclosure, each of the plurality of optical fibers has a polarization mode dispersion of less than 0.2 ps/√km.

In an embodiment of the present disclosure, each of the plurality of optical fibers has a final maximum cabled fiber attenuation of about 0.13 dB/Km at a wavelength of about 1550 nanometer after second cycle.

In an embodiment of the present disclosure, each of the plurality of optical fibers has a final maximum cabled fiber attenuation of about 0.285 dB/Km at a wavelength of about 1625 nanometer after second cycle.

In an embodiment of the present disclosure, the plurality of optical fibers has a total number of fibers selected from a group. The group includes 864 fibers, 576 fibers and 432 fibers.

In an embodiment of the present disclosure, each of the plurality of optical fibers has a maximum cabled fiber attenuation of about 0.4 dB/Km at a wavelength of about 1310 nanometer and 1625 nanometer. In addition, each of the plurality of optical fibers has a maximum cabled fiber attenuation of about 0.3 dB/Km at a wavelength of about 1550 nanometer.

In an embodiment of the present disclosure, the optical fiber cable includes a plurality of buffer tubes. In addition each of the plurality of buffer tubes includes a water swellable tape having a thickness of about 0.15±0.05 millimetres. Further, the water swellable tape inside each of the plurality of buffer tubes has an overlap of about 4 millimeters with corresponding buffer tube.

In an embodiment of the present disclosure, the plurality of stacked ribbons inside each of a plurality of buffer tubes includes 4 edge fibers.

In an embodiment of the present disclosure, the optical fiber cable includes a central strength member, a first layer, a second layer, a third layer and at least two ripcords. In addition, the central strength member is made of a fiber reinforced plastic. Further, the first layer surrounds the central strength member. The first layer is a water blocking tape.

Furthermore, the second layer surrounds the plurality of buffer tubes. The second layer is made of a plurality of binders and a water swellable tape. The third layer surrounds the second layer. The third layer is made of UV proof black polyethylene material.

Furthermore, a plurality of ripcords is positioned in between the second layer and the third layer.

The optical fiber cable has a weight of about 420 kilogram when the number of optical fibers in the optical fiber cable is 864. In addition, the optical fiber cable has a short term tensile strength of about 2700 Newton. Further, the optical fiber cable has a long term tensile strength of about 890 Newton. The optical fiber cable has impact strength of about 25 Newton meter. The optical fiber cable has torsion of about ±180°. The optical fiber cable has a crush resistance of about 2200 Newton/100 millimetres. The optical fiber cable has a minimum bending radius of about 20 D during installation. The optical fiber cable has a minimum bending radius of about 15 D during operation.

In another aspect, the present disclosure provides a buffer tube. The buffer tube includes an optical fiber ribbon stack. The optical fiber ribbon stack includes a plurality of stacked ribbons. In addition, each ribbon of the plurality of stacked ribbons includes a plurality of optical fibers. The plurality of optical fibers includes edge optical fibers. Further, the edge optical fibers are defined as the optical fibers having a MAC number of atmost 7.2 disposed at a first end and a second end of a first ribbon and a last ribbon of the plurality of stacked ribbons.

DESCRIPTION OF THE DRAWINGS

Having thus described the disclosure in general terms, reference will now be made to the accompanying figures, wherein:

It should be noted that the accompanying figures are intended to present illustrations of exemplary embodiments of the present disclosure. These figures are not intended to limit the scope of the present disclosure. It should also be noted that accompanying figures are not necessarily drawn to scale.

REFERENCE NUMERALS IN THE DRAWINGS

For a more complete understanding of the present invention parts, reference is now made to the following descriptions:

100—The optical fiber cable.
102—Geometrical center geometrical center.
104—longitudinal axis.
106—The central strength member.
108—The first layer.
110—Buffer tubes.
112—Optical fiber ribbon stack.
114—Stacked ribbons.
116—The second layer.
118—The third layer.
120—Fillers.
122—Ripcords.
124—First end.
126—Second end.
128—First ribbon.
130—Last ribbon.
200—Buffer tube.
202—Optical fiber ribbon stack
204—Stacked ribbons.
206—Optical fibers.
208—Edge optical fibers.
210—Edge optical fibers.
212—Diagonal distance.
214—Water blocking tape.

DETAILED DESCRIPTION OF THE INVENTION

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

Figure 1:
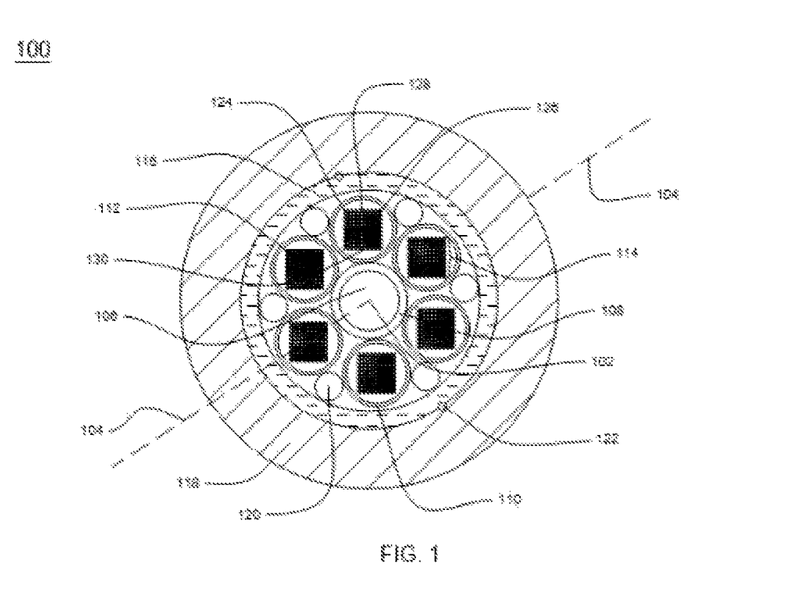
FIG. 1 illustrates a cross sectional view of an optical fiber cable, in accordance with an embodiment of the present disclosure.

FIG. 1 illustrates a cross sectional view of an optical fiber cable 100, in accordance with various embodiments of the present disclosure. The optical fiber cable 100 is a multi-loose tube optical fiber cable. In an embodiment of the present disclosure, the optical fiber cable 100 is used for communication purposes. In addition, the optical fiber cable 100 includes a central strength member 106, a first layer 108, a plurality of buffer tubes 110, atleast one optical fiber ribbon stack 112, and a plurality of stacked ribbons 114. In addition, the optical fiber cable 100 includes a second layer 116, a third layer 118, a plurality of fillers 120 and a plurality of ripcords 122. The optical fiber cable 100 is a cable used for carrying light over long distances. Furthermore, the optical fiber cable 100 may simply be used to transmit optical signals (which may carry sensor data or communication data).

The optical fiber cable 100 includes the central strength member 106. The central strength member 106 provides strength to the optical fiber cable 100. In addition, the central strength member 106 lies substantially along a longitudinal axis 104 of the optical fiber cable 100. The longitudinal axis 104 passes through a geometrical center 102 of the optical fiber cable 100. In an embodiment of the present disclosure, the central strength member 106 is made of a fiber reinforced plastic. The fiber reinforced plastic is a composite material made of a polymer matrix reinforced with glass fibers. Examples of the fiber reinforced plastic include glass fiber, carbon fiber, aramid fiber and the like. In another embodiment of the present disclosure, the central strength member 106 is made of any suitable material. In an embodiment of the present disclosure, the diameter of the central strength member 106 may have any suitable value The central strength member 106 provides tensile strength and stiffness to the optical fiber cable 100. The tensile strength corresponds to a resistance shown by the optical fiber cable 100 against breaking when tension is applied. In addition, the short term tensile strength of the optical fiber cable 100 is about 2700 Newton. The long term tensile strength of the optical fiber cable 100 is about 890 Newton. Moreover, the central strength member 106 provides physical strength to the optical fiber cable 100 and resists over bending of the optical fiber cable 100. Also, the central strength member 106 prevents buckling of the optical fiber cable 100.

The optical fiber cable 100 includes the first layer 108. The first layer surrounds the central strength member 106. The first layer 108 is made of a water swellable tape. The water swellable tape prevents the ingression of water and moisture inside the central strength member 106. In addition, the first layer 108 provides barrier to prevent the ingression of water and the moisture. Further, the first layer 108 has a thickness of about 0.15±0.05 millimeters.

The optical fiber cable 100 includes the plurality of buffer tubes 110. The plurality of buffer tubes 110 are stranded around the central strength member 106 and the first layer 108 to form a stranded core. In addition, the plurality of buffer tubes 110 lies along the longitudinal axis 104 of the optical fiber cable 100. In general, each of the plurality of buffer tubes 110 provides mechanical isolation, physical damage protection and identification of a plurality of fibers. In an embodiment of the present disclosure, each of the plurality of buffer tubes 110 is hollow. In an embodiment of the present disclosure, a cross section of each of the plurality of buffer tubes 110 is circular in shape. In an embodiment of the present disclosure, each of the plurality of buffer tubes 110 is similar in structure and dimensions. In an embodiment of the present disclosure, a number of the plurality of buffer tubes 110 is 6. In another embodiment of the present disclosure, the number of the plurality of buffer tubes 110 may vary.

Going further, each of the plurality of buffer tubes 110 encloses the plurality of stacked ribbons 114. The plurality of buffer tubes 110 cover the plurality of stacked ribbons 114. Each of the plurality of buffer tubes 110 is a tube for encapsulating the plurality of stacked ribbons 114. In an embodiment of the present disclosure, each of the plurality of buffer tubes 110 is colored. In an embodiment of the present disclosure, each of the plurality of buffer tubes 110 has a different color. The coloring is done for identification of each of the plurality of buffer tubes 110. In an example, the colors may include blue, orange, green, brown, gray, white, red, black, yellow, violet, pink and aqua.

Each of the plurality of buffer tubes 110 has a thickness of about 0.6 millimeter. In an embodiment of the present disclosure, the thickness of each of the plurality of buffer tubes 110 is same. In yet another embodiment of the present disclosure, the thickness of each of the plurality of buffer tubes 110 may vary. Further, each of the plurality of buffer tubes 110 has a first diameter and a second diameter. In an embodiment of the present disclosure, the first diameter is the inner diameter and the second diameter is the outer diameter of each of the plurality of buffer tubes 110. In an embodiment of the present disclosure, the first diameter of each of the plurality of buffer tubes 110 is about 6.8±0.2 millimeter. In another embodiment of the present disclosure, the first diameter of each of the plurality of buffer tubes 110 may vary. In an embodiment of the present disclosure, the second diameter of each of the plurality of buffer tubes 110 is in a range of 8.0 millimeter±0.2 millimeter. In yet another embodiment of the present disclosure, the second diameter of each of the plurality of buffer tubes 110 may vary.

In an embodiment of the present disclosure, each of the plurality of buffer tubes 110 includes a water swellable material. The water swellable material includes a water blocking tape. The 4 millimeter width of the water blocking tape is overlapped with each of the plurality of buffer tubes. In an embodiment of the present disclosure, the water blocking tape prevents the ingression of water and moisture inside each of the plurality of stacked ribbons 114. In another embodiment of the present disclosure, the water swellable material is a thixotropic gel. Also, the thixotropic gel is a viscous fluid or gel under static conditions and flow when shaken or agitated. In an embodiment of the present disclosure, the thixotropic gel is used for filling in empty spaces inside each of the plurality of buffer tubes. In an embodiment of the present disclosure, the thixotropic gel prevents ingression of water inside each of the plurality of buffer tubes.

The optical fiber cable 100 includes the atleast one optical fiber ribbon stack 112. In addition, the atleast one optical fiber ribbon stack 112 is positioned inside each of the corresponding buffer tube of the plurality of buffer tubes 110. In an embodiment of the present disclosure, a number of the stacked optical fiber ribbons in the optical fiber cable 100 are equal to the number of buffer tubes in the optical fiber cable 100. In another embodiment of the present disclosure, the number of stacked optical fiber ribbons inside the optical fiber cable 100 may vary. In general, the stacked optical fiber ribbons are the stack of ribbons arranged inside the buffer tube. In addition, the atleast one optical fiber ribbon stack 112 includes the plurality of stacked ribbons 114.

The plurality of stacked ribbons 114 is defined as the array of ribbons placed inside each of the plurality of buffer tubes 110. In other words, plurality of optical fiber ribbons can be stacked into a bundle with a matrix structure to form a ribbon stack. In addition, the fiber ribbons are stacked on top of one another inside a buffer tube to form the plurality of stacked ribbons 114. Further, each ribbon of the plurality of stacked ribbons 114 includes a plurality of optical fibers aligned in a single row.

Each fiber of the plurality of optical fibers is used for the transmission of signals.

Each of the plurality of optical fibers has a maximum cabled fiber attenuation of about 0.4 dB/Km at a wavelength of 1310 nanometer and 1625 nanometer. In addition, each of the plurality of optical fibers has a maximum cabled fiber attenuation of about 0.3 dB/Km at a wavelength of 1550 nanometer. Further, each of the plurality of optical fibers has a polarization mode dispersion of less than 0.2 ps/√km.

In an embodiment of the present disclosure, each of the plurality of optical fibers has a final maximum cabled fiber attenuation of about 0.13 dB/Km at a wavelength of about 1550 nanometer after second cycle. In addition, each of the plurality of optical fibers has a final maximum cabled fiber attenuation of about 0.285 dB/Km at a wavelength of about 1625 nanometer after second cycle.

Further, each of the plurality of optical fibers in the plurality of stacked ribbons 114 is a fiber used for transmitting information as light pulses from one end to another. In addition, each of the plurality of optical fibers is a thin strand of glass or plastic capable of transmitting optical signals. Also, each of the plurality of optical fibers is configured to transmit large amounts of information over long distances with relatively low attenuation. Further, each of the plurality of optical fibers includes a core region and a cladding region. The core region is an inner part of an optical fiber and the cladding section is an outer part of the optical fiber. Moreover, the core region is defined by a central longitudinal axis of each of the plurality of optical fibers. In addition, the cladding region surrounds the core region. The core region has a refractive index which is greater than a refractive index of the cladding region. In an embodiment of the present disclosure, the core region has a higher refractive index than the cladding region.

In an embodiment of the present disclosure, each of the plurality of optical fibers inside each ribbon of the plurality of stacked ribbons 114 has a diameter in a range of about 255 micron±5 micron. In another embodiment of the present disclosure, the diameter of each of the plurality of optical fibers may vary. In an embodiment of the present disclosure, each of the plurality of optical fibers is a single mode fiber. In another embodiment of the present disclosure, each of the plurality of optical fibers is a multimode fiber. In an embodiment of the present disclosure, each ribbon of the plurality of stacked ribbons 114 includes 12 fibers. In another embodiment of the present disclosure, each ribbon of the plurality of stacked ribbon 114 may include any suitable number of optical fibers.

In an embodiment of the present disclosure, the plurality of stacked ribbons 114 includes the plurality of optical fibers inside each of the plurality of stacked ribbons 114. In an example, each ribbon of the plurality of stacked ribbons 114 includes a fix number of colored optical fiber. In an embodiment of the present disclosure, each ribbon of the plurality of stacked ribbons 114 is rectangular in shape with two ends. The plurality of optical fibers is placed in between first end and second end, including the first end point and the second end point. Further, the optical fibers positioned at a first end 124 and a second end 126 of a first ribbon 128 and a last ribbon 130 of the plurality of stacked ribbons 114 is termed as edge optical fibers. In an example, the first ribbon 128 is the top ribbon and the last ribbon 130 is the bottom ribbon of the plurality of stacked ribbons 114. Furthermore, the edge optical fibers are selected based on a MAC number. In other words, the optical fibers with MAC number less than 7.2 are selected for edge fibers. In general, MAC number is an attribute to the optical fibers. The MAC number is defined as the ratio of mode field diameter to cutoff wavelength. The optical fiber cable 100 includes 4 edge optical fibers inside each of the plurality of buffer tubes 110. The optical fibers with MAC number less than 7.2 are required to prevent edge fibers failure in negative temperature cycling test. In general, the temperature cycling test is a standard test used to check the optical performance of the optical fiber cable 100 under temperature variation. In general, the edge optical fibers with MAC number more than 7.2 faces optical loss in temperature cycling test. Thus, the edge fibers with MAC number less than 7.2 are selected for the optical fiber cable 100 to prevent edge fiber failure in negative temperature cycling test. Furthermore, the edge fiber selection with MAC number less than 7.2 facilitates in reducing micro bending losses in negative temperature.

The edge fiber failure of the plurality of stacked ribbons results in the shrinkage of the plurality of buffer tubes in negative temperatures. Thus, the water blocking tape is used inside each of the plurality of buffer tubes 110 to prevent edge fiber failures in negative temperature. In addition, the water blocking tape has an overlap of about 4 millimeters with each of the plurality of buffer tubes 110. The water blocking tape inside each of the plurality of buffer tubes 110 has thickness in a range of about 0.15±0.05 millimeter. Further, the water blocking tape inside each of the plurality of buffer tubes 110 has a width of about 30 millimeter.

In an embodiment of the present disclosure, the first diameter of each of the plurality of buffer tubes 110 is increased to achieve attenuation in negative temperature cycling test. In addition, the first diameter of each of the plurality of buffer tubes 110 is increased to reduce the shrinkage of the plurality of buffer tubes 110 in negative temperatures. The first diameter of the plurality of buffer tubes 110 represents the inner diameter. The optimization of the first diameter of each of the plurality of buffer tubes 110 facilitates in the reduction of shrinkage of buffer tube to around 6.2 millimeters to 6.3 millimeters. Further, the optimization of the first diameter of each of the plurality of buffer tubes facilitates in maintaining a change in attenuation of less than 0.3 dB/Km at the wavelength of about 1625 nanometer.

In an embodiment of the present disclosure, the diagonal distance of the atleast one optical fiber ribbon stack 112 is optimized to achieve attenuations in negative temperatures. In general, the diagonal distance is defined as the distance between any two opposite corner of the atleast one optical fiber ribbon stack 112. In addition, wherein a difference between a first diameter of each of the plurality of buffer tubes 110 and the diagonal distance of the corresponding optical fiber ribbon stack 112 constitutes a gap of about 0.35 millimeter.

Going further, the optical fiber cable 100 includes the second layer 116. The second layer 116 surrounds the plurality of buffer tubes. The second layer 116 is made of a plurality of binders and a water swellable tape. In an embodiment of the present disclosure, the second layer 116 acts as a binding element for the plurality of buffer tubes 110. In an embodiment of the present disclosure, each of the plurality of binders is made of a material selected from a group. The group consists of polyester, aramid and polypropylene.

In an embodiment of the present disclosure, the plurality of binders and the water swellable tape facilitates absorption of water and moisture. In addition, each of the plurality of binder yarns prevents ingression of the water inside the optical fiber cable 100. Further, the second layer 116 binds the stranded plurality of buffer tubes 110 to prevent opening up of the S-Z stranded plurality of buffer tubes 110.

Further, the optical fiber cable 100 includes the third layer 118. The third layer 118 surrounds the second layer 116. The third layer 118 layer interacts directly with ambient environment. In addition, the third layer 118 is a sheathing layer. The third layer 118 protects the optical fiber cable 100 against the crush, the bend and tensile stress along the length of the optical fiber cable 100. In an embodiment of the present disclosure, the third layer 118 is made of UV proof black polyethylene material. In another embodiment of the present disclosure, the third layer 118 is made of a material selected from a group. The group consists of polyamides, polyethylene and polypropylene. In another embodiment of the present disclosure, the third layer 118 is made of any suitable material. The third layer 118 is characterized by a thickness. In an embodiment of the present disclosure, the third layer 118 has the thickness in the range of 1.6 millimeter±0.1 millimeter. In another embodiment of the present disclosure, the thickness of the third layer 118 may vary.

In an embodiment of the present disclosure, the optical fiber cable 100 includes the plurality of fillers 120. The plurality of fillers 120 is positioned around the first layer 108 of the optical fiber cable 100. In addition, the plurality of fillers 120 is placed at the interstices between the plurality of buffer tubes 110. Further, each of the plurality of fillers 120 is made of fiber reinforced plastic. Furthermore, each of the plurality of fillers 120 is coated with a polyethylene material. The plurality of fillers enables circularity of the optical fiber cable 100. Also, each of the plurality of fillers is used for retaining geometry of the optical fiber cable 100. In another embodiment of the present disclosure, each of the plurality of fillers 120 is made of any other suitable material.

Further, the optical fiber cable 100 includes the plurality of ripcords 122. In an embodiment of the present disclosure, the plurality of ripcords 122 includes two ripcords. In another embodiment of the present disclosure, the optical fiber cable 100 may include more number of ripcords. In an embodiment of the present disclosure, each of the plurality of ripcords 122 is placed between the second layer 116 and the third layer 118. The plurality of ripcords 122 lies substantially along the longitudinal axis 104 of the optical fiber cable 100. In an embodiment of the present disclosure, each of the plurality of ripcords 122 facilitates stripping of the third layer 118. In an embodiment of the present disclosure, each of the plurality of ripcords 122 is made of a polyester material. In another embodiment of the present disclosure, each of the plurality of ripcords 122 is made of any suitable material. In an embodiment of the present disclosure, each of the plurality of ripcords 122 has circular cross-section.

The optical fiber cable 100 has a weight of about 420 kilograms per kilometer. In addition, the optical fiber cable 100 has a crush resistance of about 2200 Newton. Further, the optical fiber cable 100 has a short term tensile strength of about 2700 Newton. Furthermore, the optical fiber cable 100 has a long term tensile strength of about 890 Newton. Furthermore, the optical fiber cable 100 has impact strength of about 25 Newton meter. Furthermore, the optical fiber cable has torsion of about ±180. Furthermore, the optical fiber cable 100 has a minimum bending radius of about 20 D during installation. Also, the optical fiber cable 100 has a minimum bending radius of about 15 D during operation. In an embodiment of the present disclosure, the optical fiber cable 100 includes 864 optical fibers. In another embodiment of the present disclosure, the optical fiber cable 100 includes 576 optical fibers. In yet another embodiment of the present disclosure, the optical fiber cable includes 432 optical fibers. In yet another embodiment of the present disclosure, the optical fiber cable includes any suitable number of optical fibers.

Figure 2:
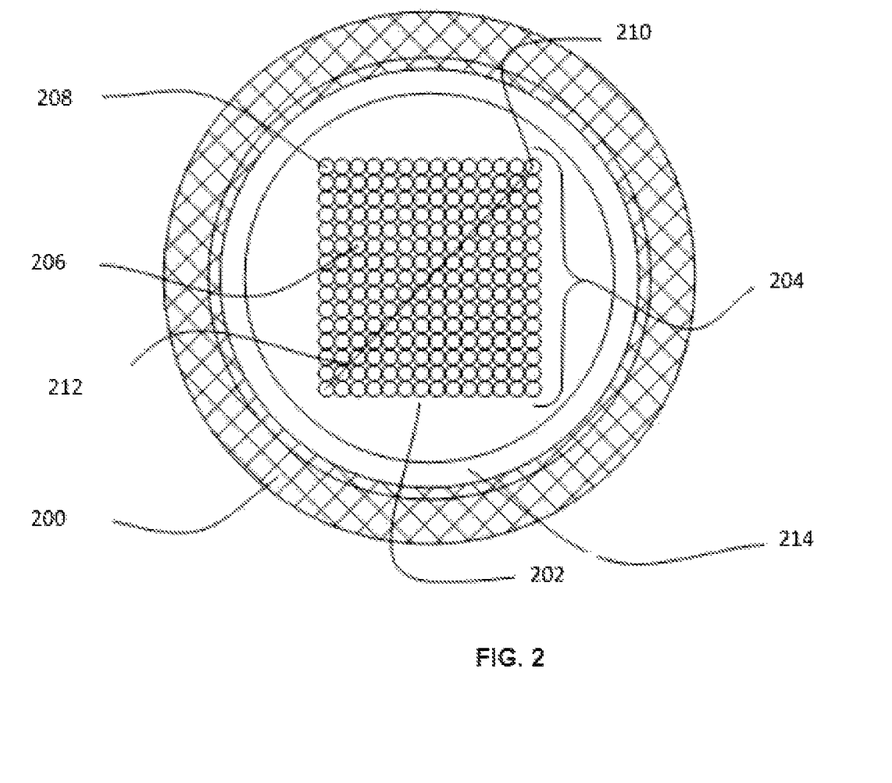
FIG. 2 illustrates a cross sectional view of a buffer tube, in accordance with an embodiment of the present disclosure.

FIG. 2 illustrates a cross sectional view of a buffer tube 200, in accordance with various embodiments of the present disclosure. In general, the buffer tube 200 provides mechanical isolation, physical damage protection and identification of fibers. In an embodiment of the present disclosure, a cross section of the buffer tube 200 is circular in shape. Going further, the buffer tube 200 is a tube for encapsulating a plurality of stacked ribbons 202. Furthermore, the buffer tube 200 has a thickness of about 0.6 millimeter. In yet another embodiment of the present disclosure, the thickness of the buffer tube 200 may vary. Furthermore, the buffer tube 200 has a first diameter and a second diameter. In an embodiment of the present disclosure, the first diameter is the inner diameter and the second diameter is the outer diameter of the buffer tube 200. In an embodiment of the present disclosure, the first diameter of the buffer tube 200 is about 6.8±0.2 millimeter. In another embodiment of the present disclosure, the first diameter of the buffer tube 200 may vary. In an embodiment of the present disclosure, the second diameter of the buffer tube 200 is in a range of about 8.0 millimeter±0.2 millimeter. In yet another embodiment of the present disclosure, the second diameter of the buffer tube 200 may vary.

The buffer tube 200 includes an optical fiber ribbon stack 202. The optical fiber ribbon stack 202 includes a plurality of stacked ribbons 202. The plurality of stacked ribbons 202 is defined as the array of ribbons placed inside the buffer tube 200. In other words, plurality of optical fiber ribbons can be stacked into a bundle with a matrix structure to form the optical fiber ribbon stack 202. In addition, the fiber ribbons are stacked on top of one another inside the buffer tube 200 to form the plurality of stacked ribbons 202. Further, each ribbon of the plurality of stacked ribbons 204 includes a plurality of optical fibers 206 aligned in a single row. Furthermore, each fiber of the plurality of optical fibers 206 in each ribbon of the plurality of stacked ribbons 204 is used for the transmission of signals. Each of the plurality of optical fibers 206 has a maximum cabled fiber attenuation of about 0.13 dB/Km at a wavelength of about 1550 nanometre. In addition, each of the plurality of optical fibers 206 has a maximum cabled fiber attenuation of about 0.285 dB/Km at a wavelength of about 1625 nanometre Further, each of the plurality of optical fibers 206 in the plurality of stacked ribbons 204 is a fiber used for transmitting information as light pulses from one end to another. In addition, each of the plurality of optical fibers 206 is a thin strand of glass or plastic capable of transmitting optical signals. Also, each of the plurality of optical fibers 206 is configured to transmit large amounts of information over long distances with relatively low attenuation. Further, each of the plurality of optical fibers 206 includes a core region and a cladding region. The core region is an inner part of an optical fiber and the cladding section is an outer part of the optical fiber. Moreover, the core region is defined by a central longitudinal axis of each of the plurality of optical fibers. In addition, the cladding region surrounds the core region. The core region has a refractive index which is greater than a refractive index of the cladding region. In an embodiment of the present disclosure, the core region has a higher refractive index than the cladding region.

In an embodiment of the present disclosure, each of the plurality of optical fibers 206 inside each ribbon of the plurality of stacked ribbons 204 has a diameter in a range of about 255 micron±5 micron. In another embodiment of the present disclosure, the diameter of each of the plurality of optical fibers 206 may vary. In an embodiment of the present disclosure, each of the plurality of optical fibers 206 is a single mode fiber. In another embodiment of the present disclosure, each of the plurality of optical fibers is a multimode fiber.

In an embodiment of the present disclosure, the plurality of stacked ribbons 204 includes the plurality of optical fibers 206 inside each of the plurality of stacked ribbons 204. In an example, each ribbon of the plurality of stacked ribbons 204 includes a fix number of colored optical fiber. In an embodiment of the present disclosure, each ribbon of the plurality of stacked ribbons 204 is rectangular in shape with two ends. The plurality of optical fibers 206 is placed in between the first end and the second end, including the first end and the second. Further, the optical fibers positioned at the first end and the second end of a first ribbon and a last ribbon of the plurality of stacked ribbons 204 is termed as edge optical fibers 208 and 210. Furthermore, the edge optical fibers 208 and 210 are selected based on a MAC number. In other words, the optical fibers with MAC number less than 7.2 are selected for the edge fibers. In general, MAC number is an attribute to the optical fibers. The MAC number is defined as the ratio of mode field diameter to cutoff wavelength. The optical fibers with MAC number less than 7.2 are required to prevent edge fibers failure in negative temperature cycling test. In general, the temperature cycling test is a standard test used to check the optical performance of the optical fiber cable under temperature variation. In general, the edge optical fibers with MAC number more than 7.2 faces optical loss in temperature cycling test. Thus, the edge optical fibers 208 and 210 with MAC number less than 7.2 are selected for the optical fiber cable 100 to prevent edge fiber failure in negative temperature cycling test. Furthermore, the edge fiber selection with MAC number less than 7.2 facilitates in reducing micro bending losses in negative temperature.

The buffer tube 200 includes a water blocking tape 214. The 4 millimeter width of the water blocking tape 214 is overlapped with the buffer tube 200. In addition, 14% width of the water blocking tape 214 overlapped with the buffer tube 200. The overlapping of the water blocking tape 214 with the buffer tube 200 facilitates in maintaining the change in attenuation of less than 0.3 dB/Km at the wavelength of 1625 nanometer in negative temperature. Further, the water blocking tape 214 prevents the ingression of water and moisture inside each of the plurality of stacked ribbons 204. The water blocking tape 214 inside the buffer tube 200 has thickness in a range of about 0.15±0.5 millimeter. Further, the water blocking tape 214 inside the buffer tube 200 has a width of about 30 millimeter.

The water blocking tape 214 is overlapped on the buffer tube 200 with the help of a former tool. In general, the former tool with a ceramic nose is designed for guiding the plurality of stacked ribbons 204. In addition, the former tool with the ceramic nose provide sufficient guiding length which results in the uniform overlap of water blocking tape 214 over the buffer tube 200 throughout the length. Further, the former tool is used to properly guide the plurality of stacked ribbons 204 inside the buffer tube 200. Furthermore, the overlapping of water blocking tape 214 and the guiding of the plurality of stacked ribbons 204 is done at high line speed. Also, the former tool design with guiding nose & more than 50% overlapping portion at tip of formal tool provides better cushioning to the optical fibers and reduces fiber attenuation.

In an embodiment of the present disclosure, a single unit direct threading sleeve is required to align the water blocking tape 214 and the plurality of stacked ribbons 204 to the center of the buffer tube 200. In addition, the single unit direct threading sleeve facilitates in getting uniform overlapping of the water blocking tape 214 with the buffer tube 200.

In an embodiment of the present disclosure, the single unit direct threading sleeve and cross head provides maximum attenuations of about 0.203 dB/Km at a wavelength of about 1550 nanometre and a maximum attenuation of about 0.221 dB/Km at a wavelength of about 1625 nanometre at buffering stage. In addition, the single unit direct threading sleeve facilitates in achieving an alignment of 180 degree.

In an embodiment of the present disclosure, the maximum length required of the cross head is 20 millimetre to reduce the heat transfer to optical fibers and water blocking tape 214 which adversely affects the attenuation of edge optical fibers 208 and 210. In an embodiment of the present disclosure, reduced cross head size facilitates in the reduction of overall heat transfer to the water blocking tape 214. Thus, the reduction of overall heat transfer of the water blocking tape 214 reduces the shrinkage of the water blocking tape 214 to about 28 millimetres to 25 millimetres.

In an embodiment of the present disclosure, the reduced cross head size with increase in water blocking tape 214 size provides better cushioning effect to the plurality of optical fibers. The failure of edge optical fibers of the plurality of stacked ribbons results in the shrinkage of the buffer tube in negative temperatures. Thus, the water blocking tape 214 is overlapped with the buffer tube 200 to prevent edge optical fibers 204a, 204b failure in negative temperature. In addition, the overlapping of water blocking tape 214 with the buffer tube 200 facilitates in the reduction of shrinkage of the first diameter of the buffer tube 200 from 6.80 millimeter to 6.25 millimeter in negative temperature.

In an embodiment of the present disclosure, the first diameter of the buffer tube 200 is increased to reduce the shrinkage of the buffer tube 200 in negative temperatures. The first diameter of the buffer tube 200 represents the inner diameter. The optimization of the first diameter of the buffer tube 200 facilitates in the reduction of shrinkage of buffer tube to around 6.2 millimeters to 6.3 millimeters. Further, the optimization of the first diameter of the buffer tube 200 facilitates in maintaining a change in attenuation of less than 0.3 dB/Km at the wavelength of about 1625 nanometer in second cycle.

In an embodiment of the present disclosure, the diagonal distance 212 of the optical fiber ribbon stack 202 is optimized to achieve attenuations in negative temperatures. In general, the diagonal distance 212 is defined as the distance between any two opposite corner of the optical fiber ribbon stack 202. In an example, the first end point of the first ribbon of the plurality of stacked ribbons 204 is opposite to the second end point of the last ribbon of the plurality of stacked ribbons 204. In another example, the second end point of the first ribbon of the plurality of stacked ribbons 204 is opposite to the first end point of the last ribbon of the plurality of stacked ribbons 204. The line between the second end point of the first ribbon to the first end point of the last ribbon represents the diagonal distance 212 of the optical fiber ribbon stack 202. In an embodiment of the present disclosure, the diagonal distance of the optical fiber ribbon stack 202 is optimized to achieve attenuations in negative temperatures. In general, the diagonal distance is defined as the distance between any two opposite corner of the optical fiber ribbon stack 202. In addition, a difference between a first diameter of buffer tube 200 and the diagonal distance of the corresponding optical fiber ribbon stack 202 constitutes a gap of about 0.35 millimeter The optical fiber cable has numerous advantages over the prior art. The optical fiber cable helps in maintaining the change in attenuation of about less than 0.3 dB/Km at a wavelength of about 1625 at negative temperature by optimizing the overlap of water blocking tape with buffer tubes. In addition, the optical fiber cable helps in maintaining the change in attenuation of about less than 0.3 dB/Km at a wavelength of about 1625 nanometer by optimizing the first diameter of the buffer tube. The optimization of the first diameter of buffer tube facilitates in optimizing shrinkage of the buffer tube to around 6.2 millimeter to 6.3 millimeter. Further, the optical fiber cable facilitates in reducing micro bending losses in negative temperature by selecting edge fibers having MAC value of less than 7.2. Furthermore, the optical fiber cable facilitates in preventing ribbon stack to touch inner surface of the buffer tube at high line speed by using the single unit guiding sleeve. Furthermore, the optical fiber cable facilitates to properly guide the ribbon stack and also provide optimize overlap of water blocking tape with the buffer tube at high line seed with the help of former tool. Furthermore, the optical fiber cable facilitates in the reducing the water blocking tape shrinkage by varying or optimizing cross head size. The better overlapping of the water blocking tape gives cushioning effect to the fibers and reduces attenuation.

The foregoing descriptions of pre-defined embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

What is claimed is:

1. An optical fiber cable comprising:
   at least one optical fiber ribbon stack, wherein the at least one optical fiber ribbon stack comprises a plurality of stacked ribbons, wherein each ribbon of the plurality of stacked ribbons comprises
   a plurality of optical fibers, wherein the plurality of optical fibers comprises edge fibers, wherein the edge fibers are disposed at a first end and a second end of a first ribbon and a last ribbon of the plurality of stacked ribbons and the edge fibers have a MAC number of at most 7.2; and
   a plurality of buffer tubes, wherein each of the plurality of buffer tubes comprises an optical fiber ribbon stack of the at least one optical fiber ribbon stack, wherein a difference between a first diameter of each of the plurality of buffer tubes and a diagonal distance of the corresponding optical fiber ribbon stack constitutes a gap upto 0.35 millimeter, wherein each of the plurality of buffer tubes has a maximum shrinkage of 11.29%.

2. The optical fiber cable as claimed in claim 1, wherein each of the plurality of buffer tubes is made of a thermoplastic material and has a thickness of 30 millimetres and wherein each of the plurality of buffer tubes has a first diameter in a range of 6.8±0.2 millimetres.

3. The optical fiber cable as claimed in claim 1, wherein each of the plurality of optical fibers has a polarization mode dispersion of less than 0.2 ps/√km.

4. The optical fiber cable as claimed in claim 1, wherein each of the plurality of optical fibers has a final maximum cabled fiber attenuation of 0.13 dB/Km at a wavelength of 1550 nanometer after second cycle.

5. The optical fiber cable as claimed in claim 1, wherein each of the plurality of optical fibers has a final maximum cabled fiber attenuation of 0.285 dB/Km at a wavelength of 1625 nanometer after second cycle.

6. The optical fiber cable as claimed in claim 1, wherein the plurality of optical fibers has a total number of fibers selected from a group, wherein the group comprises 864 fibers, 576 fibers and 432 fibers.

7. The optical fiber cable as claimed in claim 1, wherein the plurality of stacked ribbons inside each of the plurality of buffer tubes comprises 4 edge fibers.

8. The optical fiber cable as claimed in claim 1, wherein each of the plurality of optical fibers has a maximum cabled fiber attenuation of 0.4 dB/Km at a wavelength of 1310 nanometer and 1625 nanometer, wherein each of the plurality of optical fibers has a maximum cabled fiber attenuation of 0.3 dB/Km at a wavelength of 1550 nanometre.

9. The optical fiber cable as claimed in claim 1, wherein each of the plurality of buffer tubes comprising a water swellable tape having a thickness of 0.15±0.05 millimetres, wherein the water swellable tape inside each of the plurality of buffer tubes has an overlap of 4 millimetres with the corresponding buffer tube.

10. The optical fiber cable as claimed in claim 1, further comprising:
    a central strength member, wherein the central strength member is made of a fiber reinforced plastic;
    a first layer, wherein the first layer surrounds the central strength member, wherein the first layer is a water blocking tape;
    a second layer, wherein the second layer surrounds one or more buffer tubes, wherein the second layer is a binder and a water swellable tape;
    a third layer, wherein the third layer surrounds the second layer, wherein the third layer is made of UV proof black polyethylene material; and
    a plurality of ripcords positioned in between the second layer and the third layer.

11. The optical fiber cable as claimed in claim 1, wherein the optical fiber cable has a weight of 420 kilogram, wherein the optical fiber cable has a short term tensile strength of 2700 Newton, wherein the optical fiber cable has a long term tensile strength of 890 Newton, wherein the optical fiber cable has an impact strength of 25 Newton metre, wherein the optical fiber cable has a torsion of ±180°, wherein the optical fiber cable has a crush resistance of 2200 Newton/100 millimetres, wherein the optical fiber cable has a minimum bending radius of 20 D during installation and wherein the optical fiber cable has a minimum bending radius of 15 D during operation.

12. The optical fiber cable as claimed in claim 1, further comprising a plurality of fillers, wherein each of the plurality of fillers is made of a fiber reinforced plastic up coated with a polyethylene material.

* * * * *